United States Patent Office 3,102,333
Patented Sept. 3, 1963

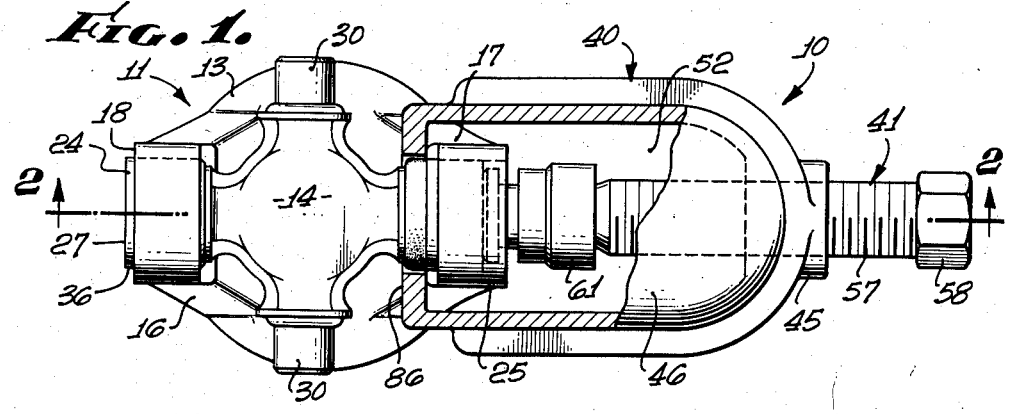
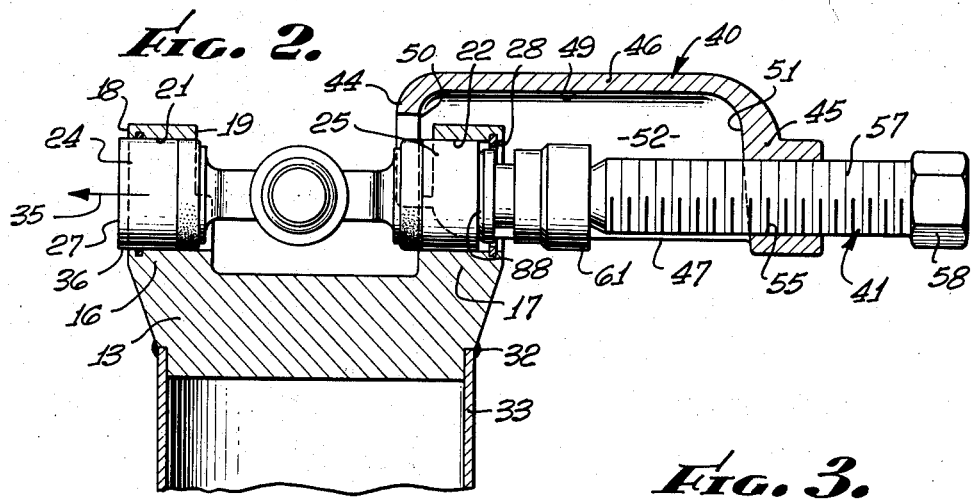
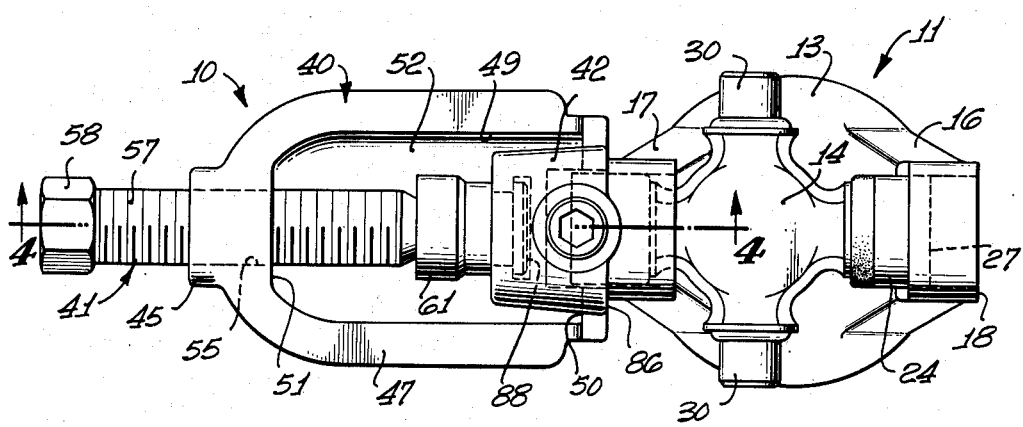
INVENTORS.
PAUL THORNTON
RAYMOND G. McCARTHY
By Beehler & Shanahan
ATTORNEYS.

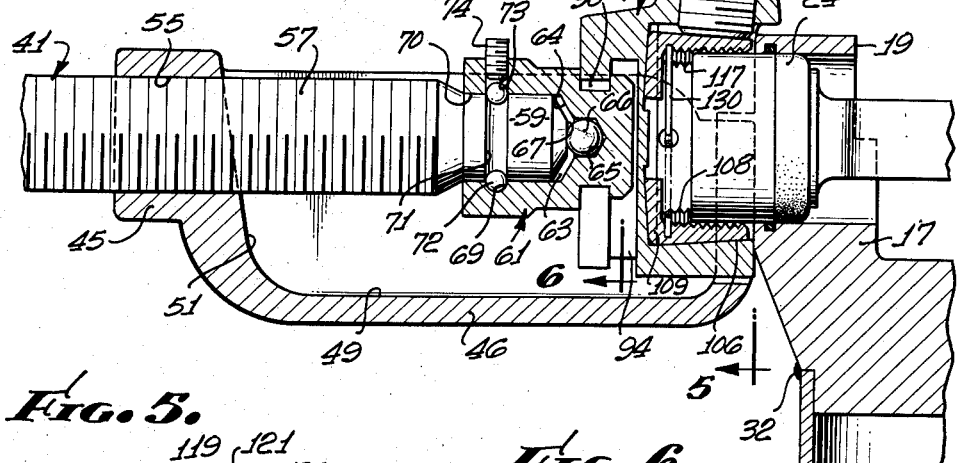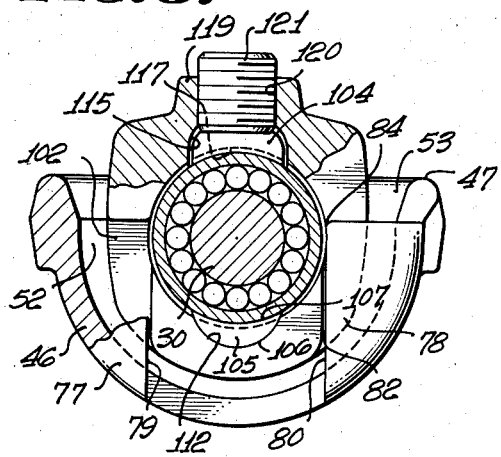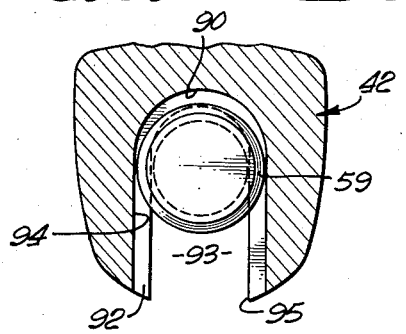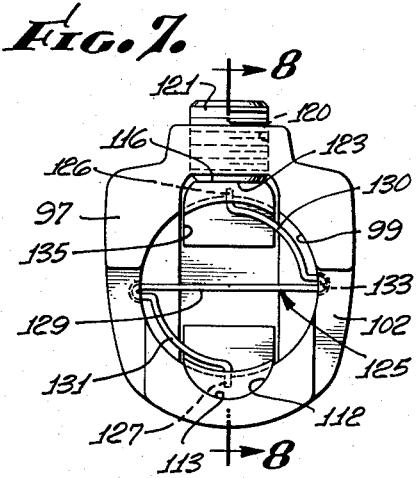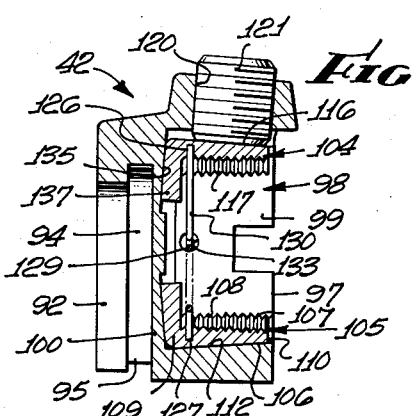
INVENTORS.
PAUL THORNTON
RAYMOND G. McCARTHY
By Beehler & Shanahan
ATTORNEYS.

3,102,333
ARTICLE-FORCING TOOL
Paul Thornton, 1974 Oak St., South Pasadena, Calif., and Raymond G. McCarthy, 2845 Thorndike St., Pasadena, Calif.
Filed Jan. 9, 1961, Ser. No. 81,316
6 Claims. (Cl. 29—257)

This invention relates to a tool which is adapted for use in installing and removing force-fitted bushings, sleeves or linings, pins and other inserts or articles in or from a device.

The particular embodiment of this invention which has been chosen for purposes of illustration herein, is especially well-adapted for use in removing and installing bearing cups of a conventional universal joint of a drive shaft of an automobile. Such conventional universal joints comprise two yokes on the ends of two shaft sections, the yokes being interconnected by a cross having its ends journaled in bearing cups which are force-fitted in sockets formed in the yokes. Bearing cups of such universal joints are subject to severe strains and stresses and in time become worn or broken and require repair or replacement. It is a frequent occurrence for automobile service men to be faced with the job of repairing or replacing the bearing cups of a drive shaft universal joint. The bearing cups in their installed positions have their outside surfaces flush with or positioned inwardly of the outside surfaces of the drive-shaft yokes, and the cups become corroded and frozen in their sockets, whereby it is a most difficult and time consuming operation to remove them.

Tools have been designed and used heretofore for removing bearing cups from the universal joints of automobile drive shafts; but these are clumsy and inefficient and unreliable in operation whereby a mechanic attempting to use such a tool often has to resort to the use of a vise and a hammer and a punch for removing the bearing cups. Also, more often than not, the bearing cups become damaged in being removed and it is necessary to replace the removed cups with new cups.

It is a general object of this invention to provide a tool for use in force-fitting an article into a device and for removing the article from the device, the tool having an article gripping collet which is easily demountable from the tool for ease and simplicity in operating the tool.

Another object of this invention is to provide an improved tool of the above-mentioned character which is capable of firmly gripping but a mere projecting edge of an article which is force-fitted in a device, such gripping operation being for the purposes of extracting the article from the device with the use of the tool.

Another general object of this invention is to provide an improved tool of the above-mentioned character which is especially well adapted for use in installing and in removing bearing cups from a universal joint of an automobile drive shaft, which tool is rugged in construction, simple and easy to operate, and highly reliable in performing the intended operations of the tool.

Further objects and advantages of the invention will appear during the following part of this specification wherein the details of construction and mode of operation of a preferred embodiment of the invention are described with reference to the accompanying drawing, in which:

FIG. 1 is an end view of the cross and one yoke with bearing cups of a conventional universal joint of an automobile drive shaft, having a tool of this invention engaged therewith, the tool being shown in a position of an initial operation for removing the bearing cups from the yoke;

FIG. 2 is a central longitudinal section through the joint parts and through the tool taken along line 2—2 of FIG. 1;

FIG. 3 is a view similar to that of FIG. 1 but showing the tool engaged on the opposite side of the yoke from that illustrated in FIG. 1, the tool being in a position for extracting a projecting bearing cup from the joint yoke;

FIG. 4 is a central longitudinal section taken along line 4—4 of FIG. 3;

FIG. 5 is a cross-section through the tool and the yoke of the joint, taken along line 5—5 of FIG. 4;

FIG. 6 is a detail cross-section through the tool taken along line 6—6 of FIG. 4;

FIG. 7 is an elevation showing the front end of the collet of the tool; and,

FIG. 8 is a central section through the collet taken along line 8—8 of FIG. 7.

Referring to the drawings in greater detail, there is shown a tool of this invention, designated generally by reference numeral 10, the illustrated tool being adapted for removing and installing bearing cups from a conventional universal joint, designated generally by reference numeral 11, of an automobile drive shaft. Such universal joint comprises two interextending yokes, only one of which is shown at 13, and a cross 14. Each yoke has two diametrically opposed yoke arms 16, and 17, the outside surfaces of such yoke arms being designated by reference numeral 18, and the inside surfaces by numeral 19. The arms of each yoke have axially aligned openings 21 and 22 extending therethrough, these openings serving as sockets for bearing cups 24 and 25 respectively. The bearing cups are force-fitted into their sockets and are of an axial dimension such that when the joint is fully assembled and ready for operation the outwardly facing surface 27 of each bearing cup is positioned inwardly of the outside surface 18 of its respective yoke arm. Retainer rings 28 are usually provided in the yoke sockets adjacent the outside surfaces 18 for insuring against axial movement of the bearing cups in their sockets.

The cross 14 has four ends 30, one set of diametrically opposed ends being journalled in the bearing cups respectively of one yoke while the other set of diametrically opposed ends 30 of the cross are journalled in the bearing cups respectively of the other yoke of the joint. In FIG. 2 the yoke 13 is shown to be secured as by weld 32 in the end of a shaft section 33 of the automobile drive shaft, it being understood that the other yoke of the universal joint which is not shown in the drawing is similarly connected to another shaft section of the automobile drive shaft.

To remove the bearing cups 24 and 25 for repair or replacement purposes, it is necessary first to remove any retaining rings 28. One bearing cup, e.g. 25, is then forced inwardly of the yoke in the direction of arrow 35 shown in FIG. 2, thereby to force the diametrically opposed bearing cup 24 outwardly of the yoke such that the outer end portion 36 of the cup 24 will extend outwardly beyond the outside surface 18 of its yoke arm. The bearing cup 24 is then in position to be gripped around its projecting end 36 and extracted by the tool 10 from the yoke.

Tool 10 which embodies this invention and is designed for use in removing bearing cups from a universal joint even in cases where the bearing cups have become corroded or frozen in their sockets, comprises a body 40, a push-pull rod here shown in the form of a screw 41, and a collet 42 for gripping the projecting end portion of a bearing cup to extract the bearing cup.

Tool body 40 comprises a front portion 44, a rear portion 45 and a side portion 46 which is integral with and serves to connect the front and rear portions. For the illustrated embodiment, side portion 46 is semi-circular in cross-section, as best appears in FIG. 5, terminating at side edge surfaces 47. Inside surface 49 of side portion 46, inside surface 50 of front portion 44, and inside surface 51 of rear portion 45 define a space or hollow 52 in the body. The side edge surfaces 47 with the inside surfaces of the front and rear portions define a gap 53 by which the hollow 52 is open between the front and rear portions. For purposes of convenience of reference herein, a longitudinal axis of the body may be considered as being along the line 2—2 in FIG. 1 of the drawing.

Rear portion 45 of body 40 has a female screw thread or tapped opening 55 formed therein, the axis of the opening being along the longitudinal axis of the body. A stem portion 57 of screw 41 extends through the tapped opening 55 whereby the screw 41 is reciprocable axially in the body 40 upon turning of the screw. The outer end of the screw stem 57 has a head 58 integral therewith, here shown as a hexagonal head, for convenience in turning the screw as with a wrench. The inner end portion 59 of the screw stem has a swivel 61 mounted thereon such that the swivel may be held against rotation as the screw stem is turned on its axis. Screw 41 serves in one operation of the tool to exert a pushing force upon a bearing cup as illustrated in FIGS. 1 and 2 of the drawing, and in another operation to exert a pulling force through the collet 42 to extract a bearing cup from the universal joint as is illustrated in FIGS. 3 and 4.

In the illustrated embodiment, the swivel 61 is mounted on the inner end portion 59 of the screw stem by means of a ball bearing connection, the structural details of which appear in FIG. 4. The stem end portion 59 is smaller in diameter than the screw threaded portion of the screw and it extends into an opening 63 formed in the swivel. The swivel has a bottom wall 64 defining the inner end of the opening 63 and the swivel has a cavity 65 formed in the center thereof and open to the bottom wall 64 for receiving a ball 66 which becomes engaged by the inner end surface 67 of the screw stem. Thus when the tool is operated to push a bearing cup from its socket, the screw stem 57 bears upon the swivel 61 through the ball bearing 66 which is located axially of the stem and of the swivel thereby to provide a bearing connection of low resistance.

To prevent removal of the swivel 61 from the end of the screw stem 57, the stem end portion 59 has a circumferentially continuous groove 69 formed therein and the inside wall 70 of the swivel has a complementary groove 71 formed therein. The grooves 69 and 71 form an annular race which receives a plurality of balls 72. The balls 72 become disposed in the race 69—71 by being passed into a radially extending port 73 formed in the swivel adapted to be closed by a plug 74. When the tool 10 is operated to extract a bearing cup from the universal joint as illustrated in FIGS. 3 and 4 of the drawing, the pulling force resulting from turning of the screw 41 in its tapped opening 55 is transmitted from the screw stem through the balls 72 to the swivel 61.

Referring again to the details of construction of the front portion 44 of the tool body 40, as appears best in FIG. 5 such front portion is of generally U-shaped configuration having oppositely disposed sides 77 and 78 presenting mutually facing walls 79 and 80 respectively which define a recess 82 in the front portion of the tool body. Such recess is open at 84 to the gap 53 of the tool body and the recess is aligned with the screw 41. The front portion of the tool body defines a flat front surface for the tool, such front surface being designated by reference numeral 86 and being disposed in a plane perpendicular to the longitudinal axis of the body. The front recess 82 is large enough in size to permit placement of the tool body over a yoke arm 16 or 17 as shown in FIGS. 1 and 2 with the yoke arm extending to the body hollow 52 and with the yoke arm being engaged at its inside surface 50 of the front portion of the tool body. With the tool in the position shown in FIGS. 1 and 2, a user of the tool may turn the screw 41 to move the swivel end of the screw forwardly in the tool body until the front end surface 88 of the swivel will engage the outwardly facing surface 27 of a bearing cup 25. Continued turning of the screw will then force the bearing cup 25 inwardly of the yoke 13, as explained above, with the result that the bearing cup 24 will be pushed radially outwardly enough to expose an edge 36 thereof for the next operation of extracting the bearing cup 24.

As mentioned above, the retracting cup or collet 42 is employed in the operation of extracting a bearing cup, the collet being connected on the swivel end of the screw 41 and being adapted, as explained hereinafter, to grip the exposed end portion 36 of a bearing cup. For releasably connecting the collet to the swivel the swivel has an annular groove 90 formed in the outside surface thereof and spaced from the front end surface 88 of the swivel, such groove being of appropriate dimensions to accommodate a U-shaped flange 92 which defines an opening 93 of a T-slot 94 formed in the rear end portion of the collet. Slot 94 is open at 95 to permit passage of the swivel into the T-slot.

At its forward end or front end the collet has an open cavity 98 formed therein, the same being defined by a circumferentially extending inside wall 99 and a bottom wall 100. The collet has recesses 102 formed therein mating with the sides 77 and 78 of the front portion of the tool body such that the collet may move forwardly in the tool body to a position where the front end surface 97 of the collet will be in the plane of the front end surface 86 of the tool body.

An important feature of the tool of this invention is that the collet 42 has gripping members therein which are so constructed and arranged in the collet to grip a bearing cup with increasing force as the pulling force being exerted by the tool upon the bearing cup increases. In the illustrated embodiment such gripping members are formed as a pair of diametrically opposed wedges 104 and 105. These wedges are movable from the positions thereof shown in FIGURE 8 in a direction outwardly of the cavity 98 for tightly gripping a bearing cup as will be explained hereinafter.

Referring to wedge 105, it is crescent shaped in cross-section having a convex outer surface 106 and a concave inner surface 107, the convex outer surface being smooth and the concave inner surface being roughened as with transversely extending teeth 108 formed therein. The wedge tapers from a thicker rear end or portion 109 to a thinner front end or portion 110. The wedge is received in a pocket 112 open to the collet cavity 98, and the wall or seat 113 which defines the pocket 112 has a rounded form to mate with the convex outer surface of the wedge. The inner concave surface 107 of wedge 105 is the arc surface of a segment of a cylindrical surface, i.e. the longitudinal axis (or generatrix line) of the concave surface 107 is parallel to the longitudinal axis (section line 2—2 in FIG. 1) of the collet cavity 98. The concave surface 107 remains parallel to the longitudinal axis of the cavity 98 throughout movement of the wedge 105. It is the outer convex surface 106 of the wedge which accounts for the slant or taper of the wedge. To maintain the inner concave surface 107 parallel to the longitudinal axis of the cavity, the seat 113 of the pocket 112 is inclined oppositely and to the same extent or degree as the slant of convex surface 106.

As in the case of wedge 105, the wedge 104 is receivable in a recess or pocket 115 extending out from the bottom wall 100 of the collet cavity to the front end surface 97 of the collet. Wedge 104 has a smooth outer surface 116 and a roughened or toothed inner concave surface 117, the inner concave surface 117 being parallel to the longitudinal axis of the tool and the outer surface 116 being inclined forwardly inwardly with respect to the axis of the tool. The collet has a boss portion 119 and a tapped opening 120 extends through the boss for accommodating a screw 121 which when turned is movable inwardly and outwardly with respect to the collet cavity. The screw opening 120 is inclined with respect to a plane perpendicular to the axis of the tool, so that the inner end surface 123 of the screw will bear against the flat portion of outer surface 116 of wedge 104. The screw 121 bears against the wedge 104 and moves the wedge 104 radially inward of the collet cavity, this arrangement being provided so that the collet may be adapted to accommodate bearing cups of different sizes, i.e. by the space between the inner concave surfaces of the wedges. A taper of about 5 degrees for the wedges 104 and 105 and for the forward inclination of the screw 121 provides optimum results in causing the wedges to move slightly towards each other and slightly outwardly of the collet cavity as they grip a bearing cup being pulled.

To maintain the wedges against dropping out from their respective pockets, there is a spring 125 which in the illustrated embodiment has its ends 126 and 127 received in appropriate openings formed in the wedges. Spring 125 comprises a cross-portion 129 and spring arm portions 130 and 131, the ends of the cross-portion being receivable in small recesses 133 or in the inside wall of the pocket. Thus the spring is maintained against dropping out from the collet cavity and it urges the wedges radially outwardly from each other to positions such that the wedges will bear against the concave wall of the pocket 112 in the case of wedge 105 and the inside end surface of the screw 121 in the case of wedge 104. To insure that the wedges remain in positions aligned with their respective pockets, the bottom wall 100 of the collet cavity has grooves 135 formed therein, the same being wide enough so as to accommodate legs 137 on the rear ends of the wedges thus retaining the wedges in alignment and maintaining them in a position such that their inside concave surfaces face inwardly of the cavity.

For the operation of extracting a bearing cup as illustrated in FIGS. 3 and 4, the screw 41 is retracted to a position in the tool body such that the swivel end of the screw will be spaced from the front wall portion of the tool body enough so as to accommodate reception of the collet 42. The collet 42 is then placed in the body with its T-slot engaged with the swivel. The screw is turned to move the collet forwardly in the tool body to a position where the front end face 97 of the collet becomes disposed in the plane of the front end surface of the tool body. The tool is then placed against the yoke 16 with the projecting edge portion 36 of the bearing cup 24 extending into the collet cavity. The user of the tool then turns the screw 121 to move the wedge 104 radially inward in the collet cavity to firmly grip the bearing cup between the wedges 104 and 105. The operator then rotates the screw 41 so that the front end surface 86 of the tool body bears against the outside surface 18 of the yoke arm 16 and the collet moves axially inward of the tool to pull the bearing cup 24 out from its socket or bored seat. As increased force is exerted by the tool in a direction of extracting the bearing cup from the universal joint, the wedges 104 and 105 are urged axially outward from the collet cavity and in being so urged and because of their tapered configuration by which they are urged inwardly toward the axis of the cavity they clamp more and more firmly upon the bearing cup.

In view of the foregoing it will be apparent that by this invention there is provided a push-pull tool which is simple to operate and is most efficient in that it will securely grip a bearing cup which is projected but only a bit from its universal joint. The collet of the tool is movable to a position where its front surface becomes disposed in the plane of the front end surface of the tool body. The gripping members 104 and 105 are operable to increase their gripping force as increased pulling force is exerted by the tool. Also the tool is advantageously constructed to permit easy removal of the collet thereby converting the tool from a pulling tool to one which exerts a pushing force upon an article such as a bearing cup of a universal joint of an automobile drive shaft.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the appended claims.

What is claimed is:

1. A push-pull tool for force-fitting an article into a device and for extracting said article from the device, said tool comprising an open sided body having spaced front and rear portions and a circumferentially discontinuous side interconnecting said portions and having a longitudinal axis extending through said front and rear portions, said front and rear portions and said side having inside surfaces defining a space or hollow in the body and a gap by which the hollow is open between said front and rear portions radially outward with respect to said axis, said rear portion having a tapped opening extending therethrough in the same direction as said axis, said front portion having a U-shaped surface defining a recess extending through the front portion, with said recess being open to said gap, said recess and said tapped opening being in alignment, said front portion having a device-abutment outside surface extending perpendicularly with respect to said axis, said hollow-defining inside surface of said front portion being a device-engaging surface and extending peripherially with respect to said recess, a screw having a screw threaded stem extending through said tapped opening and into said hollow whereby said screw is reciprocable axially in said tapped opening, a swivel on one end of the stem and in said hollow, a collet extending through said gap and into said hollow and having a front surface and a rear portion, means on the collet rear portion and on said swivel for interconnecting said collet rear portion and said swivel and for permitting removal of said collet from said swivel by sliding the collet in a direction radially outward of said body out through said gap, the collet having a cavity formed therein open in said collet front surface for receiving at least a portion of said article, the collet having article gripping means therein for gripping said article against unintended release thereof, said screw being movable in said body to a position at which said front surface of the collet is disposed in a plane of said device abutment surface.

2. A tool adapted for use in repairing a universal joint which interconnects two sections of a drive shaft for an automobile, said joint comprising two interextending yokes on the ends of the shaft sections respectively, each yoke having two diametrically opposed yoke arms with axially aligned sockets formed therein, bearing cups force-fitted in the sockets respectively, a cross having four ends journalled in the bearing cups; said tool comprising an open sided body having spaced front and rear portions and a side interconnecting said portions, said rear portion having a tapped opening extending therethrough, said front portion having an inside wall defining an open recess extending through the front portion, said opening and recess being in alignment with each other, a screw having a screw threaded stem extending through said tapped opening whereby the screw is movable axially in said opening, a swivel on the front end of said stem, a collet releasably engageable with said screw swivel, the collet having an opening formed therein for accommodating at least a portion of a bearing cup, wedges in said cavity for gripping said bearing cup, and spring means engaged in said collet and with said wedges for retaining the wedges in the collet cavity.

3. A tool for driving a cylindrical article into a cylindrical socket in a device, said tool comprising an open body adapted to engage said device and having a front wall and a rear wall and an axis extending through said walls, a screw extending through said rear wall and into said body and reciprocable in the direction of said axis, a recess extending through said front wall and aligned with said axis, said screw comprising a screw-threaded stem portion and a swivel, said stem portion having an inner end portion, said swivel having a cylindrical inside wall and a bottom wall defining a bore extending axially into the swivel, said stem portion being of sufficient length that when extended to its inwardmost position in the body the swivel extends into said recess, a ball bearing positioned axially of the swivel and bearing against the inner end surface of said stem portion, complementary annular grooves formed in said swivel and around said inner end portion defining a race, a plurality of ball bearings in said race preventing axial movement of said swivel with respect to said stem portion, the swivel having a radially extending port formed therein in communication with said race for admitting said plurality of ball bearings to said race, and a plug for closing said port.

4. A tool for extracting a cylindrical article from a cylindrical socket according to claim 3 and comprising means for gripping said article, said means being releasably connectable with said swivel whereby said gripping means is reciprocable in said tool body with said screw, said means comprising a pair of diametrically opposed gripping members, and means for adjusting the said members in a selected position of spaced apart relationship for receiving said article therebetween.

5. A collet for releasably gripping an article, the collet comprising a body having a forward end surface, the body having side and bottom walls defining a cavity in the body open to said end surface, the body having a plurality of pockets formed therein and open in said side walls, tapered wedges disposed in said pockets respectively, a screw reciprocable in the body toward and away from the axis of said body cavity and bearing against one of the wedges for adjusting the space between said wedges to accommodate said article between the wedges, and resilient means in the body and connected to said wedges for retaining the wedges in their recesses, said resilient means comprising a spring having a mid-portion extending diametrically of said cavity, two oppositely directed arcuate portions disposed in said cavity, said collet body having a pair of diametrically disposed recesses formed in said inside side walls for receiving the ends of said spring mid-portion thereby to secure the spring in the collet.

6. A tool for extracting a cylindrical article from a cylindrical socket in a device, said tool comprising an open body adapted to engage said device and having a front wall and a rear wall and an axis extending through said walls, a screw extending through said rear wall and into said body and reciprocable in the direction of said axis, a recess extending through said front wall and aligned with said axis, said screw comprising a screw-threaded stem portion and a swivel, said stem portion having an inner end portion, said swivel having a cylindrical inside wall defining a bore extending axially into the swivel, complementary annular grooves formed in said swivel and around said inner end portion for defining a race, a plurality of ball bearings in said race preventing axial movement of said swivel with respect to said stem portion, the swivel having a radially extending port formed therein in communication with said race for admitting said ball bearings to the race, a plug for closing said port, and means for gripping said article, said means being releasably connectable with said swivel whereby said gripping means is reciprocable in said tool body with said screw, said means comprising a gripping member, and means for adjusting said member for releasably securing said article in said gripping means.

References Cited in the file of this patent

UNITED STATES PATENTS

| 1,525,274 | Day | Feb. 3, 1925 |
| 2,397,025 | MacBlane | Mar. 19, 1946 |
| 2,755,094 | Benjamin | July 17, 1956 |

FOREIGN PATENTS

| 1,037,290 | France | Apr. 29, 1953 |